US008375286B2

(12) United States Patent
Allen et al.

(10) Patent No.: US 8,375,286 B2
(45) Date of Patent: Feb. 12, 2013

(54) SYSTEMS AND METHODS FOR DISPLAYING STATISTICAL INFORMATION ON A WEB PAGE

(75) Inventors: Paul Allen, Provo, UT (US); James Ivie, Lindon, UT (US); Greg Parkinson, Orem, UT (US); Daren Thayne, Orem, UT (US); Michael Wolfgramm, Pleasant Grove, UT (US)

(73) Assignee: Ancestry.com Operations, Inc., Provo, UT (US)

( * ) Notice: Subject to any disclaimer, the term of this patent is extended or adjusted under 35 U.S.C. 154(b) by 1926 days.

(21) Appl. No.: 10/247,769

(22) Filed: Sep. 19, 2002

(65) Prior Publication Data

US 2004/0059997 A1    Mar. 25, 2004

(51) Int. Cl.
*G06F 17/00* (2006.01)

(52) U.S. Cl. .................................. 715/208; 715/205

(58) Field of Classification Search .................. 715/500, 715/501.1, 201.1, 513, 526, 205, 206, 207, 715/208

See application file for complete search history.

(56) References Cited

U.S. PATENT DOCUMENTS

| | | | | |
|---|---|---|---|---|
| 5,761,683 A * | 6/1998 | Logan et al. | ................... | 715/206 |
| 5,806,077 A * | 9/1998 | Wecker | ...................... | 715/501.1 |
| 5,960,429 A * | 9/1999 | Peercy et al. | ...................... | 707/5 |
| 5,963,950 A * | 10/1999 | Nielsen et al. | ................. | 707/102 |
| 6,088,707 A * | 7/2000 | Bates et al. | ................. | 715/501.1 |
| 6,147,976 A * | 11/2000 | Shand et al. | ................... | 370/254 |
| 6,211,874 B1 * | 4/2001 | Himmel et al. | ................ | 715/781 |
| 6,381,637 B1 * | 4/2002 | Kamada | ......................... | 709/218 |
| 6,401,075 B1 * | 6/2002 | Mason et al. | .................... | 705/14 |
| 6,763,362 B2 * | 7/2004 | McKeeth | .................... | 707/104.1 |
| 6,826,594 B1 * | 11/2004 | Pettersen | ....................... | 709/203 |
| 7,058,695 B2 * | 6/2006 | Takagi et al. | ................. | 709/217 |
| 7,426,687 B1 * | 9/2008 | Schultz et al. | ................ | 715/208 |
| 7,487,354 B2 * | 2/2009 | Logue et al. | ................... | 713/176 |
| 7,818,435 B1 * | 10/2010 | Jellinek | .......................... | 709/229 |
| 2001/0051989 A1 * | 12/2001 | Moncreiff | ...................... | 709/206 |
| 2002/0019837 A1 * | 2/2002 | Balnaves | ....................... | 707/512 |
| 2002/0042829 A1 * | 4/2002 | Mizuhara et al. | ............. | 709/229 |
| 2002/0062323 A1 * | 5/2002 | Takatori et al. | ................ | 707/514 |
| 2002/0138331 A1 * | 9/2002 | Hosea et al. | ..................... | 705/10 |
| 2002/0161659 A1 * | 10/2002 | Veilleux et al. | .................. | 705/26 |
| 2002/0186239 A1 * | 12/2002 | Komuro | ......................... | 345/738 |
| 2003/0020756 A1 * | 1/2003 | Bates et al. | .................... | 345/788 |
| 2003/0033407 A1 * | 2/2003 | Low | .............................. | 709/224 |

(Continued)

OTHER PUBLICATIONS

Hightower et al., Graphical Multiscale Web Histories: A Study of PadPrints, ACM 1998, pp. 58-65.*

(Continued)

*Primary Examiner* — Cong-Lac Huynh
(74) *Attorney, Agent, or Firm* — Kilpatrick Townsend & Stockton LLP

(57) ABSTRACT

A method for displaying information on a display screen of a user computer comprises sending a computer readable document from a server computer to the user computer for display on the display screen. The computer readable document includes links that are viewable on the display screen and are selectable to cause subsequent documents to be rendered on the display screen. The computer readable document further includes viewable information regarding selection of the links over a certain time.

7 Claims, 4 Drawing Sheets

U.S. PATENT DOCUMENTS

| | | | |
|---|---|---|---|
| 2003/0105744 A1* | 6/2003 | McKeeth | 707/3 |
| 2003/0110304 A1* | 6/2003 | Iwaishi et al. | 709/250 |
| 2003/0163444 A1* | 8/2003 | Kotzin | 707/1 |
| 2004/0083199 A1* | 4/2004 | Govindugari et al. | 707/1 |
| 2004/0119741 A1* | 6/2004 | Teng et al. | 345/760 |
| 2004/0204128 A1* | 10/2004 | Zakharia et al. | 455/566 |
| 2005/0015394 A1* | 1/2005 | McKeeth | 707/100 |
| 2005/0080878 A1* | 4/2005 | Cunningham et al. | 709/219 |
| 2005/0204276 A1* | 9/2005 | Hosea et al. | 715/501.1 |
| 2006/0085734 A1* | 4/2006 | Balnaves | 715/512 |
| 2008/0270882 A1* | 10/2008 | Rollins et al. | 715/208 |
| 2009/0113282 A1* | 4/2009 | Schultz et al. | 715/208 |
| 2010/0235387 A1* | 9/2010 | Ong | 707/769 |

OTHER PUBLICATIONS

Notess, Internet Search Engine Update, Online, Jan 2001, vol. 25, p. 14, 1 pgs.*

Anonymous, Using NetWare Web Search, Oct. 2000, vol. 9, p. 1, 6 pgs.*

Weinreich et al., The Look of the Link—Concepts for the User Interface of Extended Hyperlinks, ACM 2001, pp. 19-28.*

Lawrence et al., Accessibility of Information on the Web, Google 1999, pp. 107-109.*

Borges et al., Data Mining of User Navigation Patterns, Google 2000, pp. 92-112.*

* cited by examiner

SYSTEMS AND METHODS FOR DISPLAYING STATISTICAL INFORMATION ON A WEB PAGE

BACKGROUND OF THE INVENTION

This invention relates generally to the field of computer networks, and in particular to the compilation and display of statistics relating to the number of times certain links on a web page are accessed. More specifically, the invention relates to the display of such statistics in the vicinity of the associated link so that a user may quickly evaluate the number of times each link has been accessed.

Today's computer networks permit screen displays, commonly referred to web pages, to be viewed on a computer display screen that is coupled to the network. Using the Internet as an example, a web page of a given web site may be produced on the user's display screen by using a commercially available web browser. The uniform record locator (URL) of the desired web site (the destination page URL) is typed into the appropriate box of the web browser, causing the destination web page to be sent from a server computer to the user's computer.

Modern web pages often have various selectable links or icons that a user may select with a pointing device, such as a mouse, to cause the destination web page to be displayed on the display screen. For example, many web sites have a home page with an outline or overview of information that may be obtained from the site by selecting various links or icons.

Web site designers or site administrators are often concerned with the layout of the site web pages. For example, a designer may wish to organize the page layout to optimize the number of hits for certain links. Such a process can be difficult if the information regarding traffic on the site in unavailable or in an inconvenient format.

Hence, this invention is related to techniques for compiling and displaying statistics on how web pages are utilized. In one aspect, the invention is related to compiling and displaying information on the number of times each link is selected. In this way, the layout of a web page may be optimized to enhance access to various links.

BRIEF SUMMARY OF THE INVENTION

In one embodiment, a method is provided for displaying statistical information regarding the use of a web page on a display screen of a user computer. According to the method, a computer readable document is sent from a server computer to the user computer to permit the document to be displayed on the display screen. The computer readable document includes links that are viewable on the display screen and are selectable to cause subsequent documents to be rendered on the display screen. The computer readable document further includes viewable information regarding selection of the links over a certain time. Preferably, the computer readable document is used to produce a web page on the user computer using a web browser. In this way, the traffic patterns for the web page are provided in a user friendly format to permit a user to quickly evaluate how the web page is being utilized.

In one aspect, the viewable information indicates the number of times each link has been selected. This information may conveniently be displayed adjacent to each link. For example, a bracketed number may be placed adjacent to each link to include the number of times the link has been selected over a given time. In this way, the web page may be viewed to obtain a visual depiction of how often each link has been accessed. With such a configuration, a designer may move and/or alter the links and then quickly evaluate the effect of the changes. In this manner, the web page may be optimized to ensure the more profitable links are configured to receive the highest traffic, and less popular links may be modified to enhance their use, or removed altogether.

In a further aspect, a log is maintained with the server computer of each time each link is accessed. Periodically, this log is parsed to extract the appropriate information regarding selection of the links. This information is then stored in a statistical database. For example, the log may be parsed to extract destination web page information and referrer web page information that together uniquely define each link. Each match is then stored in a field of the database. Each time the same combination of destination page information and referrer page information are found, the number associated with that field is incremented by one. When displaying the statistical information with the web page, the statistical database is accessed to extract the stored values.

One convenient way to transmit the viewable information regarding the selection of the links to the user computer is by incorporating this information into destination page uniform record locators that are associated with each link. In this way, a program, such as a DHTML program, may be used to extract the information regarding the number of link accesses from the uniform record locators and to display this information adjacent to each link. Since the viewable information is located in the uniform record locators, they may also be viewed by moving a pointer over the links to cause the browser to display the uniform record locator for the destination page on the display screen.

In another embodiment, the invention provides a data carrier signal having information to produce a current web page on a display screen. The current web page includes at least one link to a destination page that is selectable to cause a server computer to send a subsequent data carrier signal containing the destination web page so that it may be displayed on the display screen. The current web page further includes viewable information regarding selection of the links of the current web page over a certain time. Such information may include, for example, the number of times each link has been selected. This information may conveniently be displayed adjacent to the associated link.

In one aspect, the information in the data carrier signal includes destination page uniform record locators that are associated with each link. Conveniently, the number of times that each link has been selected may be included in the destination page uniform record locators.

DETAILED DESCRIPTION OF THE INVENTION

Figure 1:
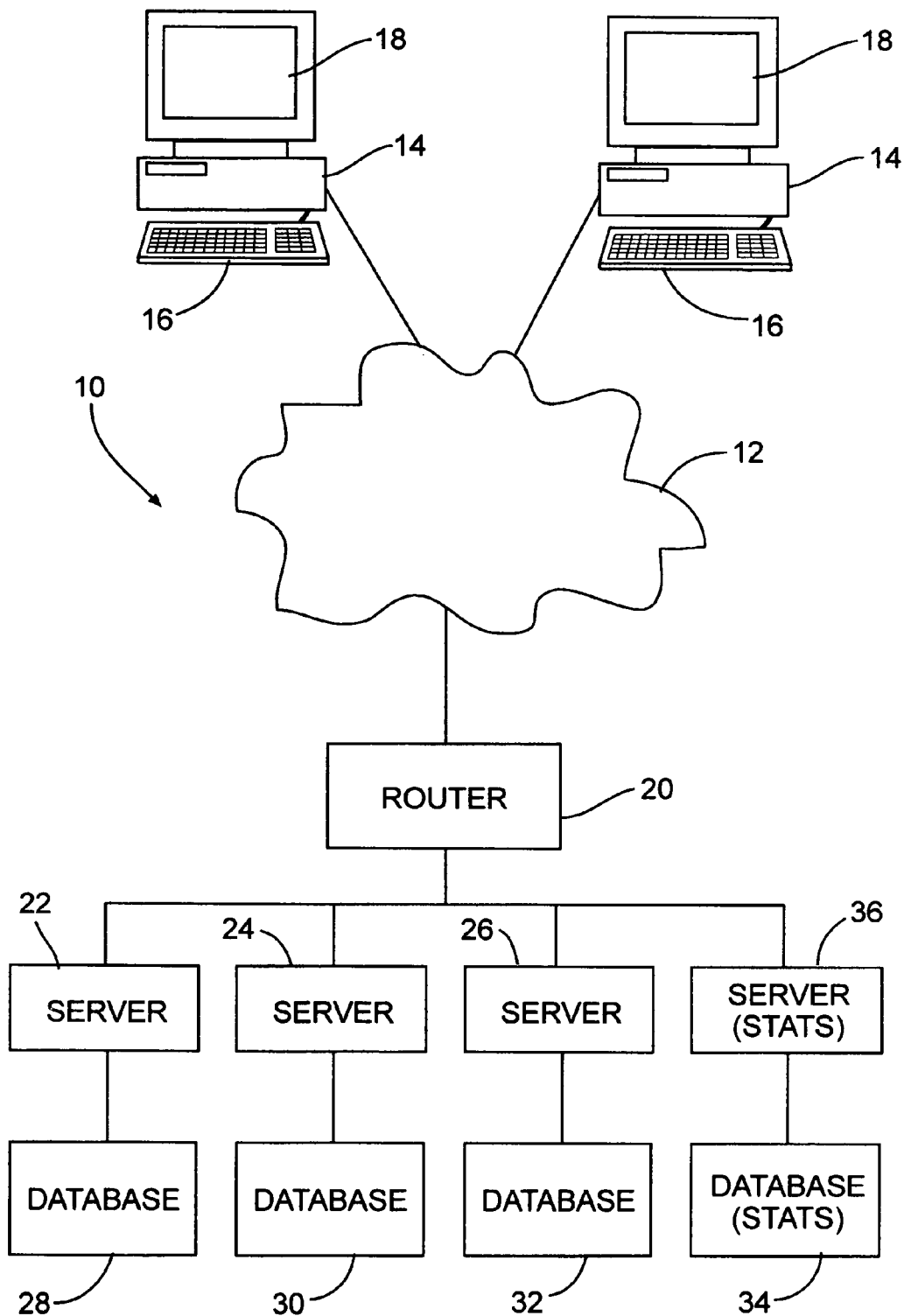
FIG. 1 is a schematic diagram of a computer network that may be used to implement the techniques of the invention.

The invention provides techniques for recording, compiling and displaying statistics on the selection of various links contained in web pages. As is known in the art, many web pages include links that are selectable to produce a subsequent web page (referred to as the destination page) on the user's display screen. These links may take on various forms, such as underlined or highlighted words, URL addresses, icons, photographs, login buttons or other buttons, messages and the like. The user may select these links using a pointing device, such as a mouse, to take the user to the new web page as is known in the art. According to the invention, each time one of these links is selected, a record of the selection is stored. This information is then compiled and displayed on a statistical web page that is similar to the original web page but includes the statistical information regarding the access. In this way, information regarding access to the links is displayed adjacent each of the links to permit a user to visualize both the layout of the web page and the statistical information regarding access to each of the links.

Such a page rendering therefore permits a web designer or site administrator to quickly evaluate how a given web page is being used. With such information the web designer may modify the web site to optimize access to the most popular links, thereby optimizing revenue. For example, a web designer may move certain links to different regions and quickly determine the effect of such a change. Other types of changes that may quickly be evaluated include changes of font style or size, colors, wording and the like. By knowing the traffic patterns for a given web page, certain links can be more effectively marketed to increase revenue for the site.

A wide variety of statistics may be recorded and compiled relating to the access of the links. For example, the information may be the number of times that each link is selected over a certain time. The statistical information could also include the percentage that each link on a given page has been accessed, i.e. a given link may be accessed 65% of the time, while the other link is accessed 35% of the time. If personal information on each user is tracked, further data may also be included, such as the age, gender, race, or other categories. In this way, a display may be provided showing a further breakdown of the type of user selecting each link. Other possible data categories that may be displayed include the time of day, day of the week, revenue that is generated for a given link, the number of page renderings, total clicks per page, the number of repeat users, and the like.

The visual depiction may take a variety of forms, such as a numerical display of the number of times each link has been selected adjacent to the appropriate link. Other depictions include graphical representations, percentages, other symbols, and the like. Further, the web page may be configured so that when a pointer is hovered over one of the links, the destination uniform record locator of the destination page is displayed. The destination uniform record locator may include the number of times that the link has been accessed.

The techniques of the invention may be implemented using standard Internet or network equipment, such as web servers, web server databases, and the like. Accordingly, the invention may be implemented using any type of computer network, including, for example, the Internet, intranets, local area networks, wide area networks, wireless networks, and the like. Further, the web pages of the invention may be viewed using any type of computer having a web browser that may be coupled to a network, including personal computers, portable computers, personal digital assistants, cell phones with web browsers, and the like.

Referring now to FIG. 1, one implementation of a computer network 10 that may be used to implement the techniques of the invention will be described. In so doing, it will be appreciated that the invention is not intended to be limited to a particular network configuration, hardware or architecture. Rather, FIG. 1 merely illustrates one way in which the invention may be implemented, and those skilled in the art will recognize other equivalent ways to implement the invention using a computer network.

Computer network 10 is implemented using the Internet 12 as the infrastructure for transmitting data between computers as is known in the art. To access a certain web site, a user enters into a computer 14 a destination web site address using a keyboard 16. Access to a given web site may be obtained by any one of a variety of computers which are designated generally by reference numeral 14. Computer 14 includes a commercially available web browser that permits the URL of the web site to be entered and displayed on a display screen 18. The request is processed by a router 20 and transmitted to any one of a set of servers 22, 24 or 26 which are each associated with a database 28, 30 or 32, respectively. Further, it will be appreciated that network connections may be made to permit any server to access any database. After extracting the appropriate information from the database, the assigned server sends back a HTML document to computer 14 where the web page is rendered on display screen 18.

The web page rendered on display screen 18 may include one or more links that may be selected using a mouse or other pointing device to cause another destination web page to be displayed on display screen 18 in a manner similar to that just described. This web page then becomes the current web page, and the previous web page is referred to as a referring web page. This same process may be performed by multiple users so that large numbers of users may simultaneous access the pages of a given web site.

A log of each user session is recorded by servers 22, 24 and 26 in a log file. The log file thus includes a record of each destination page and each referring page, with each pair uniquely defining a given link. For example, if the current (referring) page has a URL of "A", and the destination page has a URL of "B" when a link "L" is selected, then the session includes a log of "A" and "B" when link "L" was selected. Throughout the day, each server may record multiple log files.

Periodically, such as at the end of the day, these log files may be parsed to determine the number of times each link was accessed. This may be accomplished by searching for pairs of referring and destination page URLs and storing these in fields in a statistics database 34. The numbers of each of such pairs is stored in database 34 to produce a record of the number of times each link was selected for a given time period.

When a user, such as a system administrator or web page designer, wishes to view the pages of the web site along with the number of times each link has been accessed, a server 36 is placed into statistics mode using a registry setting of server 36. The URL address for one of the web pages located on this server is entered using one of computers 14 to render the HTML page. Every element of this web page is then parsed through by server 36 to determine what links the web page includes. When a link is encountered, the destination web page URL is obtained. The destination web page URL along with the URL of the current page are then queried against database 34 to determine the number of times this link has been accessed. Such a process is done for each link of the requested web page.

The information on the number of times each link has been accessed is incorporated into the URL of the destination web page that is associated with each link and transmitted back to computer 14. The browser of computer 14 then renders the requested page. If a pointer is hovered over one of the links, the destination URL is displayed on display screen 18 along with the number of times that link has been accessed. Further, a dynamic HTML or JAVA script may be used to extract the access information from the destination URL and to display this information on the web page adjacent to each link. In this way, the web page maintains its overall appearance, but also includes the number of times each link was accessed. With this configuration, the user may quickly visualize traffic patterns on the web page.

Figure 2:
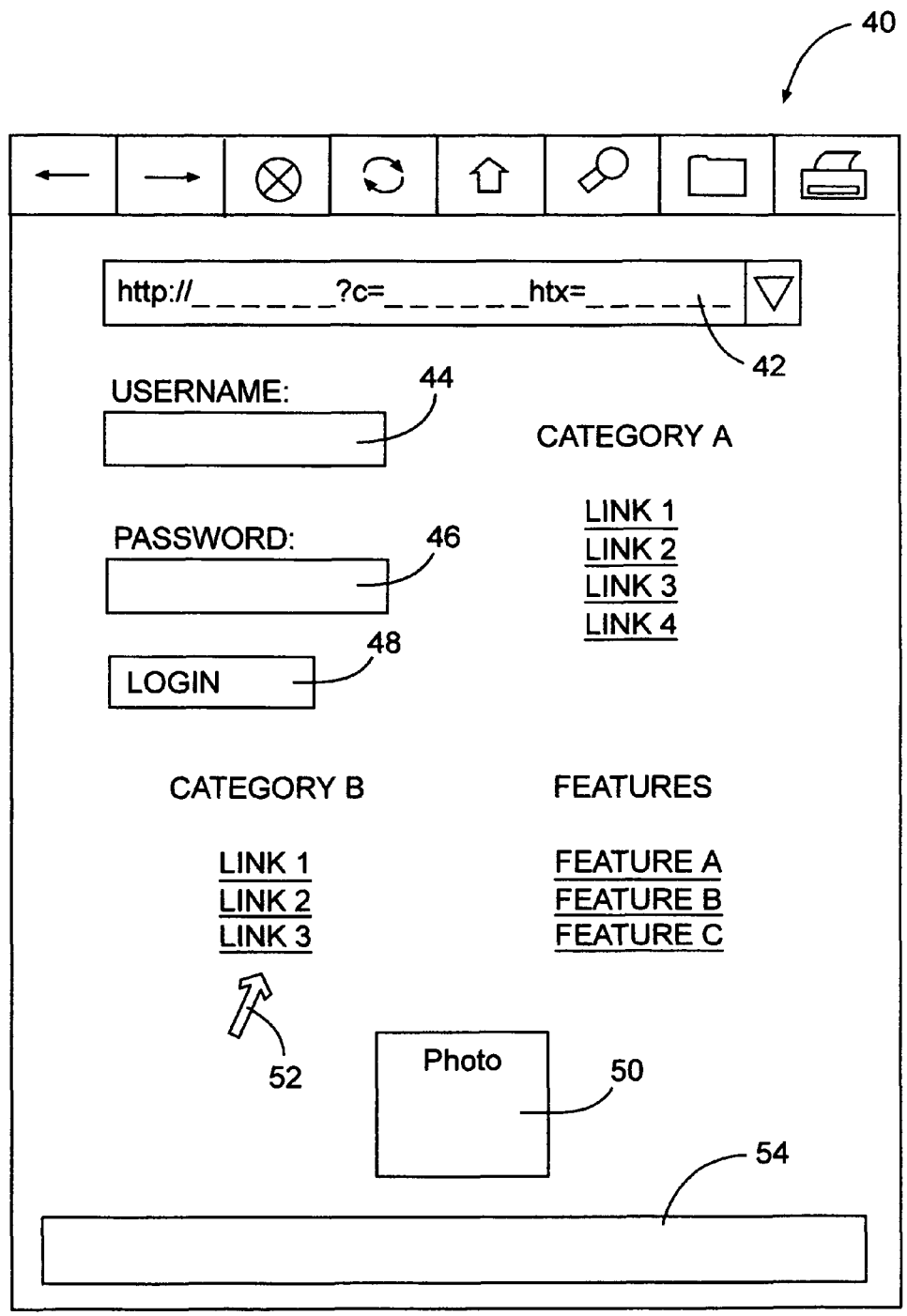
FIG. 2 illustrates a typical web page having a set of destination web page links.

Referring now to FIG. 2, one depiction of a web page 40 is shown and will be used to illustrate the display of statistical information relating to link access. In so doing, it will be appreciated that web page 40 is merely representative of a wide variety of web pages with which the techniques of the invention may be used. Web page 40 is rendered by a web browser and, as such, may include various buttons to move forward a page or back a page, to move to a home page, to refresh the page, to search, to access favorites, to print, and the like as is known in the art. Web page 40 includes an address box 42 where the URL address of the current page is displayed. As is known in the art, the URL address may be changed to take the user to a destination page.

As shown, the URL address includes a component, designated by "c=" and the page within the component, designated by "htx=". Merely by way of example, web page 40 may be the home page of the "myfamily.com" web site, where c=home and htx=loginfront. Web page 40 further includes boxes 44 and 46 for entering a user name and password to permit the user to access authorized web pages. A login button 48 may be selected once the user name and password have been entered. Displayed on web page 40 are a variety of categories and features with associated links. These links may be selected to transfer the user to destination web pages having more information for the given category or feature. Merely by way of example, category A may be for personal finance, with links 1-4 containing various articles relating to personal financing. Category B may be for sporting events, with links 1-3 have articles on various teams or events. The features categories may be for health related issues. As will be appreciated, a wide variety of such categories and features may be provided. Also shown in a photograph box 50 that may be selected to produce a larger image of the photograph or to take the user to another web page or web site.

Figure 3:
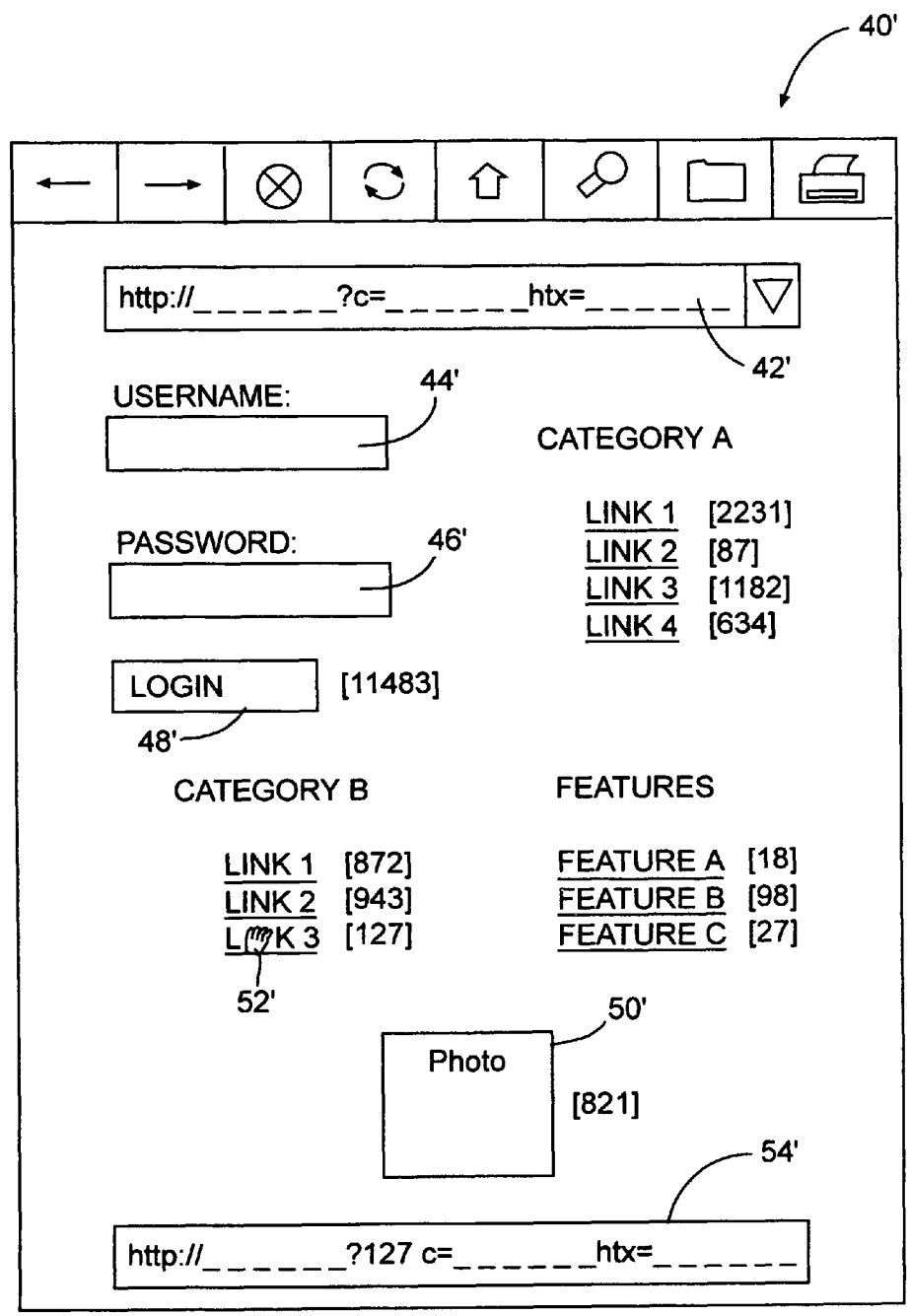
FIG. 3 illustrates the web page of FIG. 2 when modified to display statistical information on the number of times that each link has been selected according to the invention.

As is known within the art, a pointer 52 may be moved over web page 40 to select the various links. When moved over a link, the shape of the pointer may change as shown in FIG. 3. Further, web page 40 includes a destination address box 54 where the destination URL address of the link above which the pointer is hovering is displayed. In this case, it is the destination address for link 3 of category B. In such a case, the destination URL may be configured such that c=sports and htx=main.

Each time one of the links is selected, a log is kept of both the destination URL and the current or referring URL. This is then used to track the number of times each link is accessed as previously described. Shown in FIG. 3 is one way in which such statistical data may be displayed. FIG. 3 shows a web page 40' which is essentially identical to web page 40 of FIG. 2 except that web page 40' includes a depiction of the number of times each link has been accessed adjacent to each link. For convenience of illustration, the same reference numerals will be used in FIG. 3, followed by a "'".

To produce web page 40', the URL address for the server which has been enabled with the statistics capability is entered. For example, if web page 40 is produced by entering the address: www.myfamily.com, then web page 40' may be produced by entering an address. The statistical web server then transmits a HTML document having the information needed to render web page 40', which includes the destination URLs for each link along with the number of times each link has been accessed in a manner similar to that previously described. A DHTML program is executed to extract the access information and to display this information in brackets as shown in FIG. 3. In this way, the user is able to see a modified rendering of web page 40 which includes a display of the number of times each link has been accessed over a given time. As is evident from FIG. 3, the traffic patterns of web page 40' are readily viewed and permit a quick analysis of how the web page is being utilized. With such a configuration, web page 40 may be modified, and then quickly reevaluated to determine the effects of such changes.

Another feature of web page 40' is that the link access information may also be viewed by hovering over a given link. For example, as shown in FIG. 3, pointer 52 is over link 3. As a result, the destination address is displayed in box 54. Just after the "?", is the number "127" which represents the number of times link 3 has been accessed.

Figure 4:
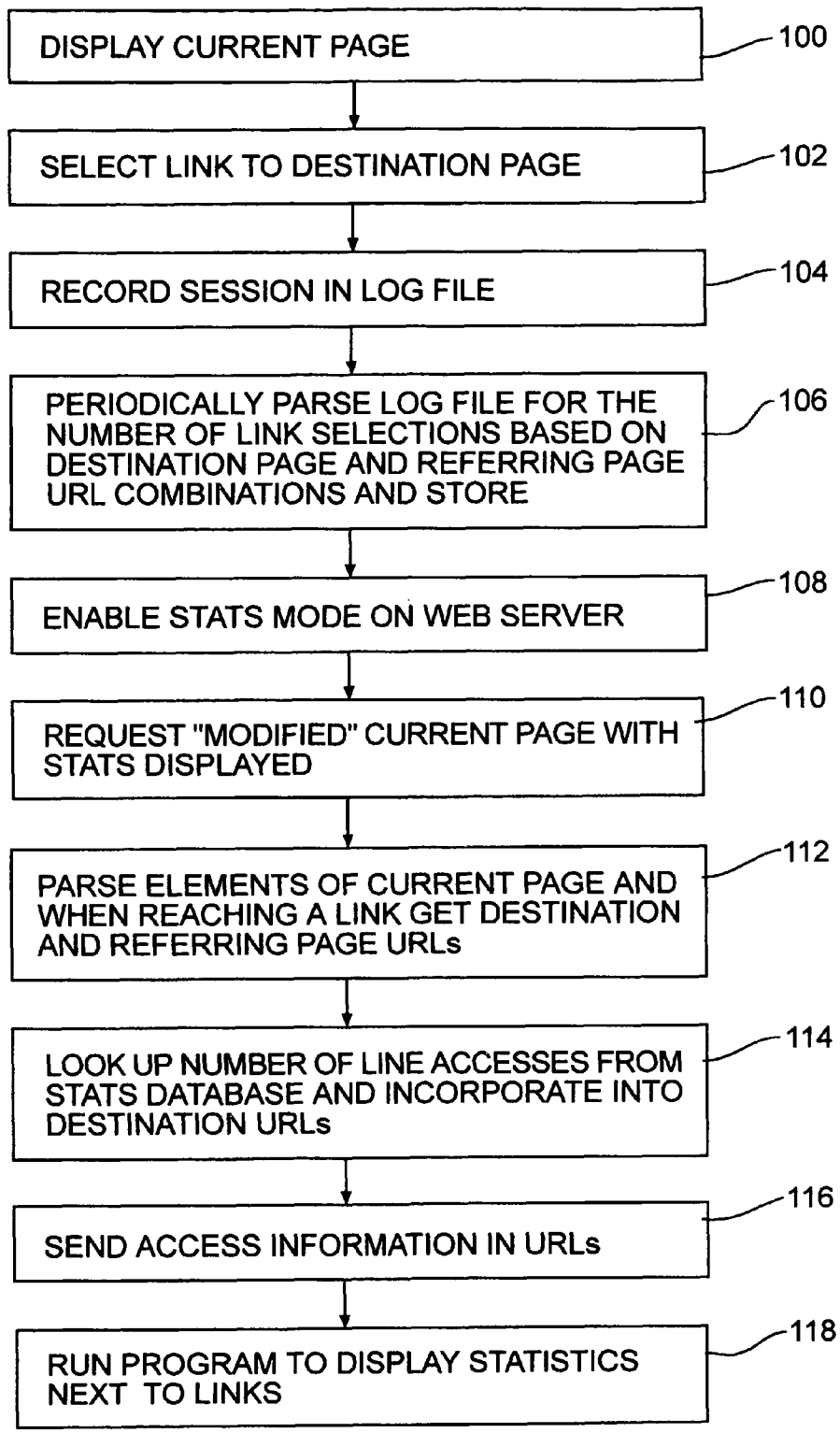
FIG. 4 is a flow chart illustrating one method for compiling and displaying information on the number of times that links of a web page have been selected according to the invention.

Referring now to FIG. 4, one method for producing and displaying link access information will be described. The process begins at step 100 where the current web page is displayed on the display screen of a computer. In step 102, a link to a destination page is selected. In turn, the destination web page is rendered on the display screen. Further, a log of this activity is recorded as shown in step 104. Periodically, the log file is parsed with an agent to determine the number of link selections based on the destination and referring URLs that uniquely define each link as shown in step 106. This information is stored in appropriate fields in a statistical database.

When ready to visualize a web page with a display of the number of link selections, a web server is enabled using a registry setting as shown in step 108. This server is accessed by requesting the "modified" current page having the statistics as shown in step 110. The web server then parses the elements of the current page and, when reaching a link, determines the destination URL of the link and the URL of the current page as shown in step 112. The database is then queried for the field containing the same destination and referring (current) page URL as shown in step 114. From that field, the number of times the link has been accessed is obtained and incorporated into the destination URLs.

As shown in step 116, the modified web page document is then sent to the user computer. In step 118, a program is run to extract the access information from the URLs and to display the statistics next to each of the links.

The invention has now been described in detail for purposes of clarity and understanding. However, it will be appreciated that certain changes and modifications may be practiced within the scope of the appended claims.

What is claimed is:

1. A method for recording website activity, the method comprising:

for a plurality of web pages, including a source page displaying links to one or more destination pages, tracking activity relating to the number of times each link has been selected from the source page by one or more users navigating among the web pages over a period of time;

in response to a user request, parsing the source page to identify the links displayed on the source page;

determining the number of times each link has been selected from the source page by one or more users;

modifying a Uniform Resource Locator (URL) for each link to include the number of times the corresponding link has been selected from the source page;

extracting from each URL, the number of times each corresponding link has been selected from the source page;

displaying on the source page the number of times each link has been selected by displaying a value adjacent each link corresponding to the number of times the link has been selected; and using the number of times each link has been selected to modify one or more of the web pages to optimize access to the most popular links.

2. The method of claim 1, further comprising: collecting demographic data relating to the users selecting each link.

3. The method of claim 2, further comprising: displaying on the source page, the demographic data relating to the users that have selected each link.

4. The method of claim 1, further comprising: displaying on the source page, a first modified URL corresponding to a first link, wherein:

the first modified URL includes the number of times the first link has been selected from the source page; and the first modified URL is displayed in addition to the value adjacent the first link.

5. A method for monitoring web traffic, the method comprising:

providing:
- a source web page; and
- one or more destination web pages, wherein the source web page includes at least one link to the destination web page;

making the destination web page available to a plurality of users;

making the source web page available to a plurality of users;

tracking, over a period of time, information related to the number of times each link has been selected on the source page;

modifying a Uniform Resource Locator (URL) for each link to include the number of times the corresponding link has been selected from the source page;

extracting from each URL, the number of times each corresponding link has been selected from the source page; and displaying on the source page, a value adjacent each link corresponding to the number of times the link has been selected.

6. The method of claim 5, further comprising: displaying on the source page, demographic data relating to users that have selected each link.

7. The method of claim 5, further comprising: displaying on the source page, a first modified URL corresponding to a first link, wherein:

the first modified URL includes the number of times the first link has been selected from the source page; and the first modified URL is displayed in addition to the value adjacent the first link.

* * * * *